United States Patent [19]

Garza et al.

[11] Patent Number: 5,707,751
[45] Date of Patent: Jan. 13, 1998

[54] SHRINK FILM AND METHODS RELATING THERETO

[75] Inventors: Oscar Trini Garza, Bettendorf; Timothy Michael Kneale; John Douglas Synder, both of Clinton, all of Iowa

[73] Assignee: E. I. Du Pont de Nemours and Company, Wilmington, Del.

[21] Appl. No.: 301,524

[22] Filed: Sep. 7, 1994

Related U.S. Application Data

[63] Continuation of Ser. No. 955,614, Oct. 2, 1992, abandoned.

[51] Int. Cl.[6] ..................................... B32B 27/08
[52] U.S. Cl. .................. 428/515; 428/34.7; 428/34.9; 428/500; 428/910; 525/240
[58] Field of Search .................. 525/240; 428/34.7, 428/34.9, 515, 910

[56] References Cited

U.S. PATENT DOCUMENTS

| | | | |
|---|---|---|---|
| 3,299,194 | 1/1967 | Golike | 264/210 |
| 4,760,116 | 7/1988 | Roberts | 525/221 |
| 4,863,768 | 9/1989 | Ishio et al. | 428/34.9 |
| 4,863,784 | 9/1989 | Lustig et al. | 428/218 |
| 4,865,902 | 9/1989 | Golike et al. | 428/215 |
| 5,112,696 | 5/1992 | Roberts | 428/516 |
| 5,128,212 | 7/1992 | Kneale et al. | 428/516 |
| 5,272,016 | 12/1993 | Ralph | 428/516 |
| 5,272,236 | 12/1993 | Lai et al. | 526/348.5 |
| 5,376,439 | 12/1994 | Hodgson et al. | 428/220 |
| 5,397,640 | 3/1995 | Georgelus et al. | 428/349 |

OTHER PUBLICATIONS

Exxon Chemical Company, Exact Facts, *Exxpol Technology*, 1, No. 1, 1–3, Feb. 1992.

Karen F. Lindsay, Materials—First 'single-site catalyst' PEs are for medical and cable applications, *Modern Plastics*, Jul. 1992.

"Materials" from Modern Plastics, Jul. 1992 p. 62 by Karen Lindsay.

PCT/US91/01860 Patent Application.

EPO Patent Application No. 90309496.9 filed Aug. 30, 1990.

*Primary Examiner*—E. Rollins Buffalow

[57] ABSTRACT

The present invention relates generally to shrink film compositions having improved properties, particularly improved shrink range, optics, toughness, (low) shrink force, (low) extractables and the like. More specifically, the improved shrink films of the present invention are directed to alloys or combinations comprising precise combinations of "narrow, substantially singular" melting point polyethylene with a higher melting point (by at least about 10° C.), polyethylene.

3 Claims, No Drawings

SHRINK FILM AND METHODS RELATING THERETO

This is a continuation of application Ser. No. 07/955,614 filed Oct. 2, 1992, now abandoned.

FIELD OF THE INVENTION

The present invention relates generally to shrink film compositions having improved properties, particularly improved shrink range, optics, toughness, (low) shrink force, (low) extractables and the like. More specifically, the improved shrink films of the present invention are directed to alloys or combinations comprising precise relative amounts of "narrow" melting point polyolefin with a higher melting point (by at least about 10° C.) polyolefin.

BACKGROUND OF THE INVENTION

Conventionally known shrink films generally comprise polyolefin (particularly polyethylene) and/or polyvinyl chloride. Other common shrink film constituents include ionomers, polyesters, polystyrenes, and polyvinylidene chlorides.

Monolayer polyolefin shrink films include both cross-linked and uncross-linked oriented polyethylene, oriented polypropylene, and oriented ethylene-propylene copolymers. Monolayer polyvinyl chloride ("PVC") shrink films involve a variety of PVC formulations.

Upon exposure to heat, a shrink film will either shrink or, if restrained, create shrink tension within the film. This heat reaction is generally activated when the wrapped product is passed through a hot air or hot water shrink tunnel. Generally, this process causes the film to shrink around the product to produce a tight, transparent wrapping which conforms to the contour of the product, while protecting the product from dirt and contamination.

Shrink film manufacture generally requires sophisticated equipment, including extrusion lines with "orientation" capability, irradiation units (when crosslinking is desired), tenter frames, mechanical center-folders, and slitters. "Racking" or "tenter framing" are orientation processes which cause the material to be stretched in the cross or transverse direction ("TD") and in the longitudinal or machine direction ("MD").

To create a shrink film, the films must typically be heated within its orientation temperature range (which varies according to the film composition, but is usually and preferably above room temperature) and below the polymer's melting temperature. After being stretched, the film is rapidly cooled; such rapid cooling or quenching freezes the film molecules in their oriented state. Upon sufficient heating, the orientation stresses are released, and the film will begin to shrink back to its original unoriented dimension.

PVC and polyolefin shrink films provide a wide range of performance characteristics, such as shrink force (the amount of force that a film exerts per unit area of its cross-section during shrinkage), degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions).

Film characteristics play an important role in selecting a particular film and may differ for different packaging applications or equipment. Consideration must be given to the packaging process and also to the product's size, weight, shape, rigidity, number of product components, and existence, if any, of other packaging materials which may be used along with the film.

Polyolefins have been most successful with applications where moderate to high shrink tensions are preferred. Such films are most easily utilized on new, automatic, high speed shrink wrapping equipment where shrink and sealing temperature ranges can be closely controlled. The polyolefins tend to seal cleaner, leaving fewer deposits and less residue, thereby extending the life of the equipment and reducing equipment maintenance.

The PVC films generally have better optics, lower shrink tensions, and will generally seal and shrink over much broader temperature ranges than the polyolefins. However, polyolefins usually do not emit corrosive gases upon sealing as do PVC films and, in this respect, are cleaner than PVC films.

Prior to the present invention, polyolefins have generally not been able to penetrate PVC film packaging applications where the products to be packaged require the lower shrink tensions and optical properties of the PVC film. Conventional polyolefin shrink films can have shrink tensions up to four times those of the PVC films and generally will not have the optical properties available from PVC shrink film.

Also, prior to the present invention PVC shrink film has been preferred over polyolefin shrink film for older, manually-operated sealers and semi-automatic wrappers where temperatures are highly variable. Older, poorly maintained wrapping equipment usually run PVC better than present monolayer polyolefins due to the combination of the generally broader shrink and sealing temperature ranges of the PVC films.

Some success has been achieved by the use of certain multilayer polyolefin shrink films having three or five layer construction and including a core layer and/or outer layers of polyester or copolyester. Exemplary of such films is MPD1055 manufactured by W. R. Grace & Co. While such shrink films have been successful for many applications, polyester and copolyester are expensive resins. Furthermore, such multilayer structures are complex to manufacture and can be difficult to recycle.

Consequently, a need exists in the art for an economical shrink film which is clean (low extractables) and which can be used to package fragile products. A need further exists for shrink films having improved heat seal strengths, and even lower shrink tensions than the presently available multilayer polyolefin shrink films. Additionally, it is desirable to obtain such a film which nevertheless maintains high free shrink properties at relatively low temperatures. This would facilitate effective shrinking at temperatures typically used in commercial heat shrink equipment without the adverse effects on package and product which can result from too high a shrink temperature. A need further exists for a broad temperature range for activating the shrink film, so that the film could be easily used on old equipment where temperatures can vary greatly during a production run.

Definitions

"Polyethylene" as used herein is intended to include not only homopolymers, but also copolymers, provided at least about 70 weight percent of the polymer is derived from ethylene. Depending upon the context, the term "polyethylene" may refer to the polymer (or copolymer) or may refer to a resin or compound containing a major portion by weight of such polymer (or copolymer).

The physical properties of polyethylenes are generally directly influenced by many factors, including: 1. comonomer constituents; 2. degree of branching; 3. amount of comonomer ($C_4$–$C_8$ alkyl groups are often polymerized onto the base chain); 4. degree of crystallinity; and 5. average molecular weight. For simplicity and following conventional practices, the overall effect of these influences will be broadly quantified (or at least approximated) by the density of the polyethylene which generally ranges from about 0.85 to about 0.98 g/cm$^3$ and also by designating the polymer as being "linear", if the polymer is substantially non-branched.

The density ranges used herein are merely an attempt to approximate certain properties of the polyethylene, which is a conventionally accepted practice in the art at the time this application is being drafted. Future advances in the art may make this designation obsolete. Indeed, some experts are predicting that with recent developments in new polyolefin catalyst systems, meticulous fine tuning of physical properties might be possible and that the traditional distinctions between polyethylene and polypropylene may one day blur.

Consequently, in the event the art does indeed advance to such a degree and new polyolefin polymers or copolymers are created which have the critical properties designated herein and therefore are capable of being equivalent and/or interchangeable with the critical polyethylenes described herein, then the definition of polyethylenes of this application is also intended to include such polyolefin polymers or copolymers which might arise in the future.

The "density" nomenclature as conventionally used in the art (and as used in this specification) to describe polyethylenes is nonspecific to a particular compound, but rather, refers instead to a range of compositions. This range often includes both homopolymers and copolymers. For example, "high density" polyethylene ("HDPE") refers to both (a) homopolymers and (b) copolymers of ethylene and an alpha-olefin (usually 1-butene or 1-hexene) which have densities greater than about 0.94 g/cm$^3$. HDPEs are generally high molecular weight polymers synthesized from Ziegler or Phillips type catalysts.

Another broad grouping of polyethylene is "high pressure, low density" polyethylene ("LDPE"). LDPEs generally have densities between about 0.915 and 0.930 g/cm$^3$ and can be either branched homopolymers or copolymers containing polar groups resulting from copolymerization with vinyl acetate, ethyl acrylate or the like. LDPEs typically contain long branches off the main chain (often termed "backbone").

Linear low density polyethylenes ("LLDPEs") are copolymers of ethylene and alpha-olefins, having a density in the range of about 0.915 to 0.940 g/cm$^3$. The alpha-olefin comonomer is typically 1-butene, 1-hexene, or 1-octene, and Ziegler-type catalysts are usually employed (although Phillips catalysts are also used to produce LLDPEs having densities at the higher end of the range).

Ultra low density polyethylenes ("ULDPEs") are copolymers of ethylene and alpha-olefins, usually 1-butene, 1-hexene or 1-octene, having densities lower than LLDPEs (generally ranging from about 0.860 to about 0.915 g/cm$^3$).

The term "polyethylene" will be used (unless indicated otherwise) to refer to any of the above broad classes of polyethylene compositions.

BRIEF SUMMARY OF THE INVENTION

The present invention is directed to an improved shrink film composition comprising:

a) a polyolefin first component having a narrow melting point, said melting point being less than about 115° C. and said first component having a molecular weight distribution (Mw/Mn) within the range of about 1 to about 4 and a density less than about 0.92 grams per cubic centimeter; and b) a polyolefin second component having a melting point at least about 10° C. greater than the first component and a maximum orientation temperature of about 2° C. less than its melting point, whereby the weight ratio of first component to second component is in the range of about 2–98:98–2.

The first component is preferably the product of a polymerization process utilizing a single site or a constrained geometry catalyst (as opposed to traditional, multi-site catalysts). Single site or constrained geometry catalyst polyolefins are well known and are available from Exxon Chemical Co. under the trademark EXACT and are also available from Dow Chemical Company.

In one embodiment, the first component is a polyethylene and the second component is also a polyethylene. The second component can be a blend of LDPE, LLDPE and VLDPE in a weight ratio of about 2–25:50–98:0–25.

Preferred embodiments of the present invention include multilayer composite shrink film structures wherein at least one of the layers comprise the dual polyolefin compositions discussed above. Certain preferred multilayer structures according to the present invention can be further defined as containing a core layer comprising the dual olefin composition described above, provided the core layer is about 40% to 95% of the total thickness of the multilayer film.

The shrink films of the present invention are preferably oriented in the machine direction ("MD") and transverse direction ("TD") and will shrink upon exposure to temperatures in the range of about 70° C. to about 90° C. in less than about 10 seconds (more preferably, will shrink upon exposure to temperatures in the range of about 75° C. to about 85° C. within about 5 seconds) or less.

DETAILED DESCRIPTION OF THE PREFERRED EMBODIMENT AND BEST MODE

Introduction

The present invention is directed to precise combinations of polyolefin: 1. a "First Component" preferably comprising "narrow, substantially singular" melting point polyethylene; and 2. a "Second Component" with a higher melting point (by at least about 10° C.) polyethylene. The First Component will generally allow for lower shrink temperatures, improved optical properties and higher shrink film strength. The Second Component will provide melt strength to allow for easier shrink film manufacture.

The final film will generally provide a sufficiently low shrink temperature to be an appropriate alternative to PVC shrink film conventionally used on old equipment which is subject to substantially temperature changes during production runs. The shrink temperature can be designed to be so low that it will virtually always be lower than the process temperature of antiquated shrink film equipment, regardless of temperature fluctuation. Each component will be discussed and then the critical parameters in combining the two components will then be outlined.

First Component: "Narrow, Substantially Singular" Melting Point Polyethylene

The "First Component" polyethylene preferably has a narrow, substantially singular melting point which is preferably less than about 115° C., more preferably less than about 90° C., yet more preferably less than about 80° C. and most preferably less than about 70° C. The preferred First Component polyethylene is also a copolymer wherein 90 weight percent or more of the polymer is derived from ethylene, more preferably 85% or more, yet more preferably about 80% or more of the polymer is derived from ethylene. Preferred comonomers include butene, hexene and/or octene, and the most preferred comonomer is octene.

The "First Component" should have a molecular weight from about 40,000 to about 200,000, and more preferably about 50,000 to about 120,000 and should have a molecular weight distribution (Mw/Mn) within the range of about 1 to about 4, more preferably about 1 to about 3. The melt index is preferably in the range of about 0.01 to about 50, more preferably about 0.12 to about 25 and most preferably about 0.15 to about 2.5.

The polyethylene of the first component preferably has a Shore A hardness according to ASTM D-2240 of at least about 60, more preferably at least about 70, more preferably at least about 80, and most preferably at least about 90. The Shore D hardness (ASTM D-2240) is most preferably greater than 20, more preferably greater than 30 and most preferably greater than 35. The preferred tensile strength at break is preferably (ASTM D-638 in pounds per square inch) greater than 500, more preferably greater than 1000 and most preferably greater than 2000.

The tensile elongation at break in percent (ASTM D-638) is preferably greater than about 500, most preferably greater than about 750. The flexural modulus in pounds per square inch (ASTM D-790) is preferably greater than 2500, more preferably greater than about 3000 and most preferably greater than about 4000. The Vicat softening point in °C. (ASTM D-1525) is preferably less than 100, more preferably less than 90, yet more preferably less than 80 and most preferably less than 70. The tensile impact in foot pounds per square inch (ASTM D-1822) is preferably greater than 150, more preferably greater than 200 and most preferably greater than 250.

Useful "First Component" materials are available from (or are presently being developed by) Dow Chemical, Exxon Chemical, Fina, Chisso, Phillips, Mobil, BASF, British Petroleum, Shell, Hoechst, Mitsui Toatsu, Idemitsu Kosan, Mitsubishi and other producers (or researchers) of single site or constrained geometry polyolefins. A method of manufacturing such materials is disclosed in a published EXXON Chemical PCT patent application, WO 91/14713, International Application Number PCT/US91/01860, "Catalyst System Of Enhanced Productivity" by Hlatky, et. al., International Filing Date Mar. 19, 1991.

The Exxon application discloses the use of a Group III-A element compound for improving the productivity of an ionic metallocene olefin polymerization catalyst. This catalyst is the reaction product of a metallocene of a Group IV-B transition metal and an ionic activator compound comprising a cation capable of donating a proton and an anion which is bulky, labile and noncoordinating with the Group IV transition metal cation produced upon reaction of the metallocene and activator compound to form the catalyst. The Exxon catalyst systems are claimed to have enhanced productivity over similar catalysts not using Group IIIA compounds for the polymerization of olefins, diolefins, cyclic olefins and acetylenically unsaturated monomers to polyolefins. The resulting polyolefins have narrow molecular weight distributions and higher weight average molecular weights than heretofore attainable with a like metallocene which is activated to an active catalyst species by reaction with an aluminum alkyl or alumoxane cocatalyst.

Useful "First Component" materials for the present invention are available from Exxon Chemical Company and sold under the trademark EXACT.

Another method of manufacturing useful "First Component" materials for the present invention is disclosed in a published European patent application EPO 0 416 815 A2 (publication number), 90309496.9 (application number), filed Aug. 30, 1990, "Constrained Geometry Addition Polymerization Catalysts, Processes For Their Preparation, Precursors Therefor, Methods Of Use, And Novel Polymers Formed Therewith" assigned to DOW Chemical. This publication discloses metal coordination complexes comprising a metal of Group III (except Sc), 4–10 or the lanthanide series and a delocalized pi-bonded moiety wherein the moiety is substituted with a constrain-inducing moiety which reduces the angle at the metal between the centroid of the pi-bonded moiety and at least one remaining substituent. The complexes preferably comprise a cyclopentadienyl or substituted cyclopentadienyl group forming part of a ring structure in which the metal is both bonded to an adjacent covalent moiety and held in association with the (substituted) cyclopentadienyl moiety. Complexes of said preferred structure are not necessarily constrained sufficiently to reduce the angle. Amidosilane and amidoalkanediyl compounds are particularly preferred. The complexes are from addition polymerization catalysts with activating cocatalysts such as Lewis acids, ammonium salts, oxidizing agents and, especially, aluminum compounds, particularly aluminum trialkyls.

Single site catalyst systems which provide appropriate First Component materials for the present invention contain generally only one active catalyst site which generally produces just one type of ethylene polymer molecule. This generally yields a polymer with very narrow molecular weight distribution ("MWD") and composition distribution ("CD") as opposed to the broad MWD and CD produced by multi-site catalysts. The narrow CD leads to a narrow melting point range and a lower peak melting point than a more conventional linear polyethylene with a similar melt index and density.

It is well known that narrow MWD polymers are somewhat more difficult to melt process due to their higher melt viscosities and lower melt strength. However, single site or constrained geometry catalyst systems for polyolefins generally allow for independent adjustment of the MWD and CD, whereby the MWD can be broadened to improve processability if desired while maintaining a narrow CD and its associated property advantages.

In the most preferred embodiment, the First component will have a narrow CD in the range of about 10 to 30 side chain branches per 1000 carbons. The hot tack strength is preferably greater than 2, more preferably greater than 4 and most preferably greater than 5 Newtons per 15 millimeters at a sealing temperature between about 80° C. and 100° C.

Second Component: "Higher Melting Point Polyethylene"

The preferred "Second Component" polyethylenes of the present invention are the linear low density (LLDPE), low density (LDPE) or the very low density polyethylenes (VLDPEs) most preferably LDPE. The most preferred comonomer for the LLDPE and ULDPE is octene.

An important feature of the second component is that it has a maximum orientation temperature of about 2° C. lower than its melting point and that it have sufficient melt strength at its orientation temperature to be capable of being oriented in a film format when used in combination with the First Component.

LLDPE and LDPEs are well known conventional polyethylenes and have been described above in the background section of this specification. LDPE is a branched polymer of ethylene, optionally of non-olefinic monomers, such as vinyl acetate, acrylate esters, carboxylic acid esters (typically acrylic acid) and metallic ion-neutralized carboxylic acids (ionomers). LDPE is commonly manufactured in autoclave or tubular reactors in which ethylene monomer is polymerized with a free radical source as an initiator. Pressures range from 15,000 to 45,000 p.s.i., and the polymers produced have a high degree of side branching, with densities from 0.910 to 0.935. In LDPE there are generally 10 to 20 branches per 1000 carbon atoms. With LDPE, control of branching is achieved primarily by varying reactor conditions. Copolymerization with monomers such as vinyl acetate, acrylate esters, and carboxylic acids also is used to adjust crystallinity of LDPE. Ester comonomers provide short branch chains that reduce crystallinity and thereby increase flexibility, toughness, and sometimes clarity. Carboxylic acid copolymers and ionomers tend to reduce crystallinity, increase toughness, and improve tensile properties.

A suitable LLDPE resin may be of the series of LLDPE resins produced by Dow Chemical Company. Several other manufacturers offer LLDPE resins. For example, Union Carbide and Exxon both produce resins with densities of 0.915 to 0.940 grams per cubic centimeter range, as do other suppliers. Resins with still higher densities are also available and would also be suitable for the present invention. Combinations of these resins may be used as the Second Component of the present invention.

The VLDPEs suitable as the Second Component for the present invention preferably have densities between about 0.915 and 0.860 g/cm$^3$. VLDPEs may be made by solution processes or fluidized bed processes. European Patent Application 84 103441.6 having publication number 120503 describes a suitable method for preparing low density, low modulus ethylene copolymers utilizing a fluidized bed. These ethylene copolymers are described as having a density of less than 0.915 g/cm$^3$ and a 1% secant modulus of less than 140,000 kPa and are believed to be suitable for the blends and films of the present invention.

VLDPEs of various densities are commercially available from Dow Chemical Company of Midland, Mich., U.S.A., Union Carbide Corporation of Danbury, Conn., U.S.A., and others.

Suitable copolymers of ethylene with 1-hexene include those having a density of 0.910 g/cm$^3$ and a melt index of 1.0. Advantageously, the melt index (as measured by ASTM D-1238, Condition E) of each above copolymer will be less than 2.0 dg/min with a melt index of 0.1 to 1.0 dg/min preferred. Also, the density of each VLDPE copolymer is preferably at least 0.901.

Beneficially, the VLDPE copolymer resins of the present invention will be copolymerized by adding C$_4$–C$_8$ alpha olefin monomer to ethylene under polymerization conditions such that the resultant resin has a density less than 0.915 g/cm$^3$. The VLPE will comprise at least 75 weight percent of its polymer units derived from ethylene and preferably at least 85 weight percent polymer units derived from ethylene. VLDPE copolymers utilized by the present invention will preferably have at least five percent by weight of polymer units derived from the alpha-olefin component of the VLDPE.

A suitable Second Component can be a blend of LDPE, LLDPE and/or VLDPE. A preferred blend has a weight ratio in the range of about 2–25:50–98:0–25 (LDPE:LLDPE:VLDPE)

Combining Component 1 with Component 2

Films of the present invention can be made from blends of Component 1 with Component 2. The preferred weight ratio of Component 1 to Component 2 is in the range of about 2:98 to about 98:2, more preferably 60:40 to 95:5 and most preferably about 75:25.

The Vicat softening point may also be used to further define the present invention. Films of the present invention can have a Vicat softening point greater than about 60° C. or greater than 75° C. A Vicat softening point between about 75° C. and 1000° C. is sometimes preferred.

Suitable films according to the present invention will beneficially have a 1% secant modulus as measured by ASTM D-882 of at least about 10,000 p.s.i. (69 MPa). Films with lower values tend to be too soft for proper handling as food packaging films for use in, for example, poultry bags. Advantageously, food packaging films of the present invention will have a 1% secant modulus between about 10,000 to 80,000 p.s.i. (69–560 MPa); this range of softness provides a desirable degree of softness for ease of handling during both film manufacturing and food packaging operations.

In one preferred embodiment, the first component is further defined as comprising 50% to about 98% polyethylene having a density of about 0.86 to about 0.915 grams per cubic centimeter (all densities used within this specification are grams per cubic centimeter unless indicated otherwise) and a melt index between about 0.5 to about 2; the second component of this embodiment is preferably present in an amount of about 2% to about 50% and is polyethylene having a density of about 0.915 to about 0.930 and a melt index of about 1.0 to about 10 (more preferably about 1.0 to about 3.0). Alternatively, the second component can be a VLDPE having a density of about 0.86 to about 0.90 in an amount of about 10% to 50%.

In another embodiment, the composition is defined (in weight percentages) of polymer as follows:

1. 50% to 98% (First Component) polyethylene with a density of about 0.860 to about 0.915 and a melt index of about 0.5 to about 2.0;
2. 2% to 50% polyethylene (Second Component) having a density of about 0.915 to about 0.925 and a melt index of about 1.0 to about 3.0); and
3. 0% to 10% ethylene vinyl acetate, ionomer or polyester.

In this embodiment, the shrink film has improved optics, better toughness and more elasticity (or recovery) than many conventionally used shrink films.

In yet another embodiment of the present invention, the film comprises 15% to about 35% Second Component which is polyethylene having a density of about 0.925 to about 0.945 and a melt index of from about 0.5 to about 1.5. About 65% to about 85% of the film is First Component polyethylene having a density of about 0.86 to about 0.92 and a melt index of about 1.0 to about 5.0.

Percentages as used herein are based upon weight percentages of polymer components only and do not include any fillers, additives or the like.

The final compositions generally will exhibit improved heat seal strength and hot tack over many conventional shrink film compositions. The compositions of the present invention also exhibit low seal initiation temperatures, low hexane extractables and low film haze.

Optional Components

The film blend may contain other components including additional polymers, copolymers, processing aids, catalyst residues and/or property enhancing additives. The film material may be further blended with one or more additional polymers or copolymers such as other VLDPEs, LDPE, HDPE, LLDPE, polypropylene, propylene copolymers, styrene polymers and copolymers, polyester, nylon, PVDC, EVOH, ethylene-vinylacetate copolymer (EVA) and ionomers.

The most preferred embodiment will have a maximum extractable portion of 5.5 percent by weight of polymer in n-hexane at 50° C. for 2 hours as further described below. This 5.5 weight percent represents the desired maximum n-hexane extractable limit for olefin copolymers of the type employed by the present invention for use in articles that contact food except for articles used for packing or holding food during cooking.

Beneficially, the maximum extractable portion as described above will be 2.6 percent which is an especially preferred embodiment of the inventive film suitable for use in articles used in packing or holding food during cooking. The above maximum extractable values correspond to current limits for a class of resins intended for use in contact with food as set forth and described by the U.S. Food & Drug Administration in 21 CFR 177.1520.

Unless otherwise noted, the resins utilized in the present invention are generally commercially available in pellet form and, as generally recognized in the art, may be melt blended or mechanically mixed by well known methods using commercially available equipment including tumblers, mixers or blenders. The resin blend may have other additional resins blended therewith in any amount. Also, if desired, well known additives, such as processing aids, slip agents, antiblocking agents, pigments, etc., and mixtures thereof may be incorporated into the film, by blending prior to extrusion.

The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen.

In extrusion of the present invention, barrel and die temperatures, for example, may range between about 170° C. and 220° C. However, depending upon such factors as other resins which may be employed (e.g. in a multilayer film), the manufacturing process used and particular equipment and other process parameters utilized, variations are expected. Actual process parameters including process temperatures will be set by one skilled in the art without undue experimentation.

In one embodiment an extrusion double bubble process is used of the type described in U.S. Pat. No. 3,456,044 where the primary tube leaving the die is inflated by admission of air, cooled, collapsed, and then preferably oriented by reinflating to form a secondary bubble with reheating to the film's orientation (draw) temperature range. For the present invention, the orientation temperature is generally above the Vicat Softening point and below the melting point of each blend component. Machine direction (M.D.) orientation is produced by pulling or drawing the film tube e.g. by utilizing two pairs of rollers travelling at different speeds, and transverse direction (T.D.) orientation is obtained by radial bubble expansion. The stretch oriented film is set by rapid cooling. Suitable machine direction and transverse direction stretch ratios are from about 2:1 to about 5:1.

Suitable thermoplastic films of the present invention exhibit one or more of the following properties: (i) a dynamic puncture resistance greater than or equal to that for conventional shrink films; (ii) a hot water puncture value of at least 20 seconds; (iii) a shrinkage value of at least about 15 percent (preferably at least 20 percent) in the machine direction and at least about 20 percent (preferably at least 25 percent) in the transverse direction; and/or (iv) a shrink force value in the machine direction that is greater than the M.D. shrink force value for either of the two essential blend components alone.

Multi-layer Films

The materials of the present invention can be incorporated into a multi-layer format. In one embodiment, the outer layers of the composite structure are preferably the shrink film compositions described above. Preferably, the outer layers are relatively thin, and the core layer comprises about 40% to 95% of the total thickness of the multilayer film.

The core layer may comprise an ethylene vinyl acetate copolymer (EVA). Suitable commercial resins are PE-3432 available from Du Pont, and having a vinyl acetate content of about 20% by weight of the copolymer, and ELVAX 3135 also available from Du Pont and having a vinyl acetate content of about 12% by weight of the copolymer.

The core layer may also comprise very low density polyethylene (VLDPE). The VLDPE contributes processability and toughness to the overall film. The VLDPE may be blended with, for example, EVA. Ethylene acrylates, such as, ethylene butyl acrylate copolymer (EBA) ethylene methacrylate (EMA) or ethylene ethyl acrylate (EEA), may also be used in the core layer. EVA copolymers, having normal butyl acrylate comonomer, are available from Quantum under the designation NPE 4774. Also suitable for use in the core layer is ethylene methyl acrylate copolymer.

Other combinations of the above components may be combined as blends suitable for the core layer. All of the materials and material blends of the core layer are characterized by their function as a shrink energy-controlling layer. Both the shrink tension and free shrink properties of the film, are largely determined by the core layer. It is therefore desirable for this layer to form at least about 40%, and more preferably at least about 70%, of the total film structure by weight.

Although it is preferred that outer layers be identical, and comprise the same polymeric material, different materials may be used. Therefore, one of the outside layers or an intermediate layer can be used in an alternative embodiment of the present invention. Useful materials for such a layer include polyester, low density polyethylene, high density polyethylene and polypropylene. These materials are commercial resins available from a number of manufacturers and suppliers.

In an alternative multilayer embodiment of the present invention, the core layer, rather than the outer layer(s), comprise the critical "First Component/Second Component" material described above. In such an embodiment, at least one outer layer would comprise HDPE, LLDPE, LDPE, ULDPE, nylon, ionomer, EVOH, polyester, styrene polymers or copolymers, PVC, polypropylene, ethylene-propylene copolymers and/or polyvinylidene chloride. The more preferred outer layer(s) would comprise polypropylene, ethylene-propylene copolymer, LLDPE, LDPE, and/or polyester. The core layer would provide about 40% to about 95% of the total thickness of the multilayer film. Such a film structure would generally provide a broad shrink temperature range, and could also provide a broad shrink temperature range and could also provide low shrink force.

In an alternative embodiment of the present invention, the First and Second Components are not alloyed together, but rather combined, whereby the First Component is made into a core layer, and the Second Component is made into at least one other layer. The outside layer is preferably polypropylene (or ethylenepropylene copolymer) or a blend of propylene copolymer and polypropylene and/or higher melting ethylene homopolymer or copolymer or both, wherein the density is about 0.92 to about 0.960 and more preferably 0.90 to about 0.93. The core layer preferably comprises polyethylene having a density of about 0.86 to about 0.90 and more preferably about 0.88 to about 0.90.

Small amounts of processing aids or other additives may be added, for example, by a master batch process, wherein the master batch comprises small amounts of processing aids or other additives. The master batch can comprise between about 1% and 100% by weight of the outer layer.

In the preferred process for making the multilayer shrink film of the present invention, basic steps include blending the polymers for the various layers, coextruding the layers to form a multilayer film, and then biaxially stretching the film. These steps and additional optional steps will be explained in detail in the paragraphs which follow.

The process begins by blending the raw materials (i.e. polymeric resin) in the proportions and ranges desired as discussed earlier. The resins are usually purchased from a supplier in pellet form and can be blended in any one of a number of commercially available blenders as is well known in the art.

During the blending process any additives and/or agents which are desired to be utilized are also incorporated. Blending of processing aids and other additives into a master batch is also preferably accomplished prior to coextrusion to insure uniform distribution of the additives throughout the resin. The blend resins and applicable additives and/or agents are then fed into the hoppers of extruders which feed the coextrusion die.

The materials are coextruded as a tube having a diameter which depends on the stretching ratio and desired final diameter. This coextruded tube is relatively thick and is referred to as the tape. Circular coextrusion dies are well known in the art and can be purchased from a number of manufacturers. In addition to tubular coextrusion, slot dies could be used to coextrude material in planar form. Well known single or multilayer extrusion coating processes could also be employed if desired.

An optional processing step which may be utilized is the irradiation of the tape by bombarding for example high energy electrons from an accelerator to cross-link the materials of the tape. Cross-linking greatly increases the structural strength of the film or the force at which the material can be stretched before tearing apart when the film materials are predominantly ethylene such as polyethylene or ethylene vinyl acetate. Thus, when using outerlayers of LLDPE, cross-linking is particularly advantageous in processing the tape into a shrinkable film.

The irradiation can improve the optical properties of the film and changes the properties of the film at higher temperatures. Preferred radiation dosages for the present multilayer film are in the range of about 1 megarad (MR) or less to about 4 megarads. Following coextrusion, quenching, and optionally irradiation, the extruded tape is reheated and continuously inflated by internal air pressure into a bubble (blown bubble technique), thereby transforming the narrow tape with thick walls into a wider film with thin walls of the desired film thickness.

After stretching, the bubble is then deflated, slit and the film wound onto semi-finished rolls called mill rolls. Orientation is achieved by raising the temperature of the tape to its orientation temperature, which is below the melting point of the highest melting component of the tape. At this point the heated tape is quickly stretched both longitudinally and transversely and quickly cooled to below its melting temperature before the residual stresses have the opportunity to relax.

Many embodiments of the present invention are possible and will be evident to a person of ordinary skill in the art upon reading the present specification and accompanying claims. Critical to the present invention is a substantially singular melting point polyethylene (or the like) in combination with a polyethylene (or the like) having a higher melting point by at least about 10° C. wherein the combination can be made into an oriented film. The resulting film will generally have improved toughness, shrinkage properties and optics, thereby providing an unexpected and significant advance in the art.

What is claimed is:

1. A multilayer heat-shrinking film structure having a core of one or more core layers and an outer layer on each side of the core, the multilayer structure core consisting essentially of:

a) a metallocene catalyzed polyolefin first component having a narrow melting point, the melting point being less than about 115° C. and the first component having a molecular weight distribution (Mw/Mn) within the range of about 1 to about 3 and a density less than about 0.92 grams per cubic centimeter; and b) a polyolefin second component having a melting point at least about 10° C. greater than the first component and an orientation temperature at least about 2° C. less than its melting point whereby the weight ratio of component a) to b) is in the range of about 50–98:2–50.

c) 0–10 weight parts ethylene vinyl acetate, ionomer or polyester.

wherein the weight parts of a), b) and c) total 100 and the core is about 40 to 95% of the total thickness of the multilayer structure.

2. A multilayer structure in accordance with claim 1, wherein at least a portion of the composition of a) is chemically bonded to the composition of b).

3. A monolayer heat-shrink film consisting essentially of:

a) a metallocene catalyzed polyolefin first component having a narrow melting point, the melting point being less than about 115° C. and the first component having a molecular weight distribution (Mw/Mn) within the range of about 1 to about 3 and a density less than about 0.92 grams per cubic centimeter; and b) a polyolefin second component having a melting point at least about 10° C. greater than the first component and an orientation temperature at least about 2° C. less than its melting point whereby the weight ratio of component a) to b) is in the range of about 50–98:2–50.

c) 0–10 weight parts ethylene vinyl acetate, ionomer or polyester.

* * * * *

UNITED STATES PATENT AND TRADEMARK OFFICE
CERTIFICATE OF CORRECTION

PATENT NO. : 5,707,751

DATED : January 13, 1998

INVENTOR(S) : Oscar Trini Garza, Timothy Michael Kneale, John Douglas Snyder It is certified that error appears in the above-identified patent and that said Letters Patent is hereby corrected as shown below:

Cover page, [75] Inventors - change "Synder" to --Snyder--

Column 12, line 24 - change "shrinking" to --shrink--

Signed and Sealed this

Thirtieth Day of June, 1998

*Attest:*

BRUCE LEHMAN

*Attesting Officer*

*Commissioner of Patents and Trademarks*